May 14, 1935.  J. E. TAMÉS  2,001,224
AUTOMOBILE TOP
Filed May 25, 1934   2 Sheets-Sheet 1
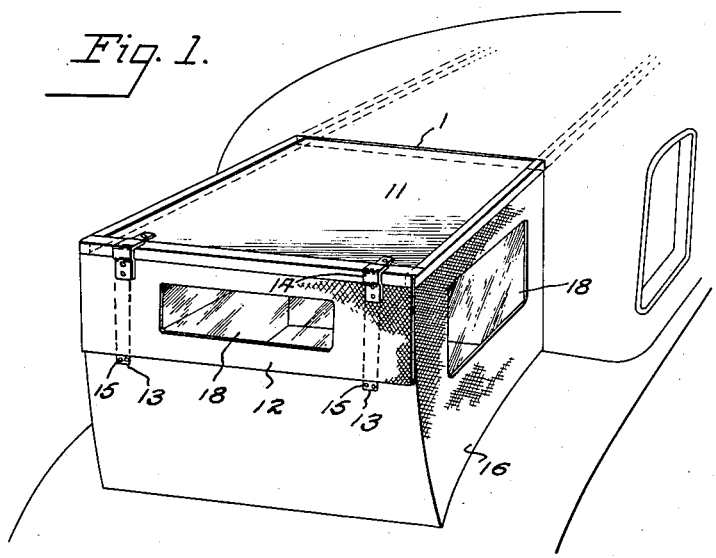
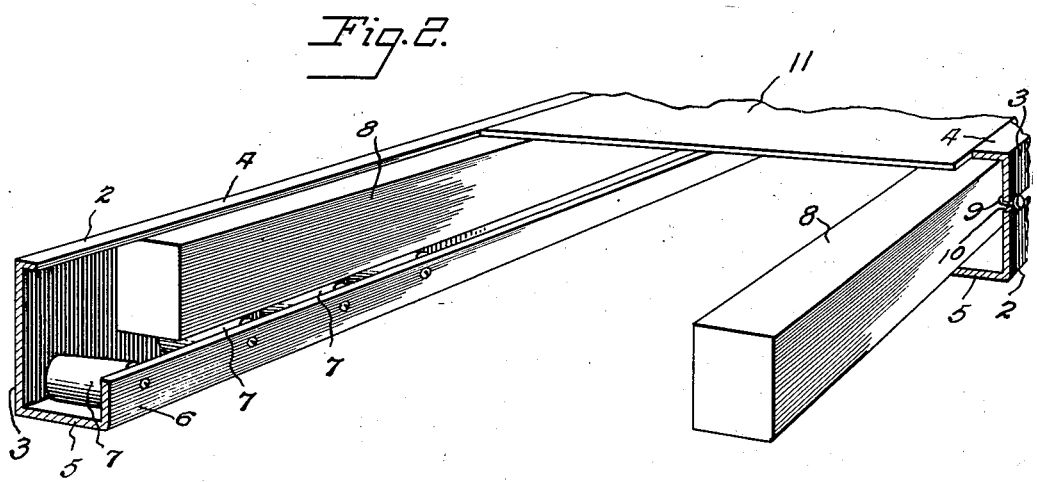
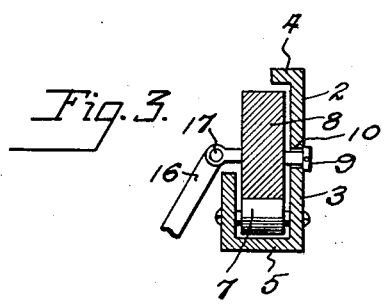
Inventor
Joseph E. Tamés
By
Attorney May 14, 1935.  J. E. TAMÉS  2,001,224
AUTOMOBILE TOP
Filed May 25, 1934    2 Sheets-Sheet 2
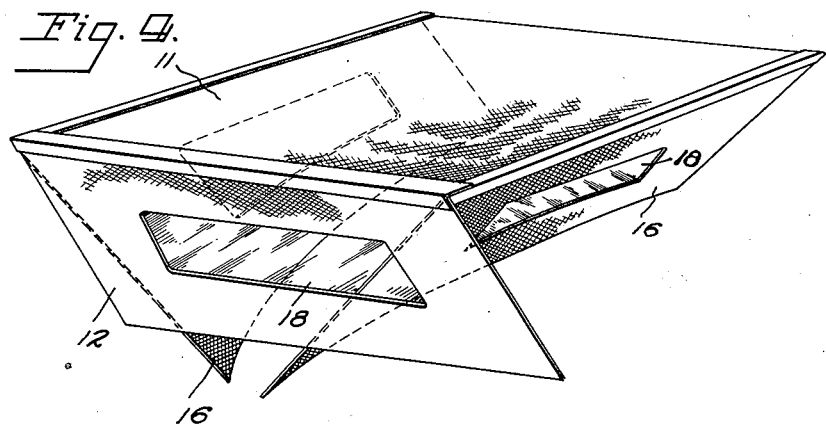
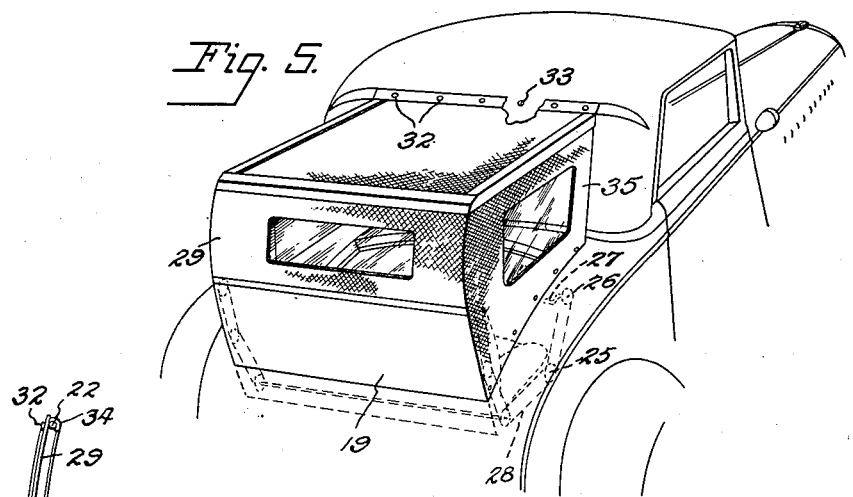
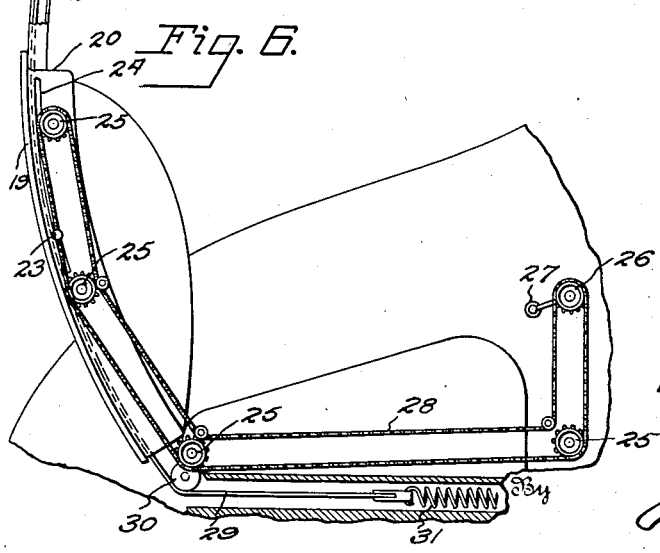
Inventor
Joseph E. Tamés
By
Attorney Patented May 14, 1935

2,001,224

UNITED STATES PATENT OFFICE 2,001,224

AUTOMOBILE TOP

Joseph E. Tamés, Mixcoac, D. F., Mexico

Application May 25, 1934, Serial No. 727,553
In Mexico June 20, 1933

4 Claims. (Cl. 296—99)

This invention is directed to an improvement in a protective covering for the occupants of the rumble seat of an automobile, the covering including a top and side and end curtains, arranged to be completely and inconspicuously housed when not in use and conveniently moved into operative relation and positioned for the protective function at will.

The primary object of the invention involves the provision of a top and curtain structure which will completely enclose the space above the rumble seat to afford adequate protection to the occupants of such seat whenever desired, all elements of the protective structure being mounted for movement relative to the rumble seat, or relative to the fixed top of the driver's seat, to permit such rumble seat protective element to be bodily housed at will completely out of the way and entirely concealed.

The invention is illustrated in the accompanying drawings, wherein:—

Figure 1 is a broken perspective view showing the movable top and side and end curtains for the rumble seat in operative position.

Figure 2 is a broken perspective view showing the mounting for the rumble seat covering.

Figure 3 is a transverse section showing the guide frame and guide bar for the covering.

Figure 4 is a perspective view of the covering.

Figure 5 is a broken perspective view showing a modified construction, the covering being shown in operative position.

Figure 6 is a vertical sectional view, partly broken away, showing the operative details.

The invention is designed for use in connection with an automobile constructed to provide the conventional rumble seat, the element forming the back of the seat having the usual hinged construction to fold down to conceal the seat when the latter is not desired for use.

The form of the invention illustrated in Figures 1 to 4 inclusive is constructed for use with that type of rumble seat automobile in which the covering for the front or driver's seat is a fixture. In this form, the rear wall of the front protective covering is formed with an opening 1 of narrow dimensions vertically and of sufficient length to receive the operative parts to be described. Secured in line with this opening and at each end thereof are hollow guide rails 2 which extend lengthwise the fixed top of the automobile and are secured against movement. These guide rails have outer side walls 3, a relatively narrow top wall 4, a full width bottom wall 5, and an inner wall 6 of materially less height than the outer wall 3. Supported in the guide rail between the inner and outer walls 3 and 6 are guide rollers 7, and slidably fixed with respect to the guides and supported on the rollers 7 are guide bars 8. The guide bars are limited in movement in both directions by pins 9 engaging slots 10 in the outer walls 2 of the guide rails, the length of the guide bars and their operative limit of movement being such as to permit the guide bars to move outwardly a distance to overlie the rumble seat.

Secured to the upper surfaces of the guide bars is a section 11, preferably rigid, as of plywood or light metal, to provide a relatively rigid top for the rumble seat covering. Hinged to the rear edge of the top section 11 is a rear curtain section 12 which may be of any appropriate material and to which are secured vertically extending strips 13 forming supports for and in line with the hinges 14 between the top and rear curtain, with such strips 13 depending below the lower edge of the curtain and provided with removable fastening elements 15 by which the rear edge of the rear curtain may be secured to the outer side of the back of the rumble seat.

Side curtains 16 are swingingly secured at 17 to the guide bars 8, preferably below the upper portion of such guide bars. It is preferred that the rear curtain and side curtains be formed with openings covered by the usual transparent material 18 in order to afford light and visibility to the occupants of the rumble seat.

When not in use, the side curtains are folded against the under side of the top 11 and the rear curtain folded against and beneath the side curtains, appropriate fastenings being employed to secure the curtains in this position. The side curtains and rear curtain thus add but little increased thickness to the top, and the completely folded structure is moved into the fixed top of the automobile proper by longitudinal movement of the guide bars 8. When desired for use, the guide bars are moved outwardly to their limit, the rear and side curtains released, and fastened in place, thus completely enclosing the area above the rumble seat, and protecting the occupants. If desired, the side curtains may remain folded against the top, affording protection against the sun, while permitting fully open sides. The lower edges of the side curtains, of course, are shaped to conform to the upper edges of the sides of the body of the automobile forming the rumble seat, and appropriate fastening means, conventional in automobile curtain structure and not necessary to illustrate, may be employed to secure the side curtains rigidly at their lower edges.

In Figures 5 and 6, there is illustrated a modified construction designed as a protective covering for rumble seats, with that type of automobile where the covering for the front or driver's seat is itself collapsible or foldable.

In this type, the foldable rear wall 19 of the rumble seat is of hollow construction and secured in each side edge thereof are guide rails 20 of U-form which conform longitudinally to the shape of the rear wall of the rumble seat. Slidable in these guide rails are guide rods 21 connected at their upper and lower ends by brace bars 22, the upper brace bar being preferably in the form of a roller. The guide bars are provided with pins 23 guided in slots 24 in the guide rails to limit the operative movement of the guide bars, exactly as indicated at 9 and 10 in the form first described. Mounted in spaced relation on the outer sides of the guide rails in the rumble seat back 19 and in the lower portion of the automobile body below the rumble seat are sprocket wheels 25, and arranged above the final sprocket wheel in the body is a similar sprocket wheel 26 designed to be operated by a handle 27 accessible from the interior of the rumble seat. An endless chain 28 passes over the respective sprocket wheels 25 and 26, any appropriate means being provided for preventing the separation of the chain and sprocket wheels. The pin 23 which extends through the slot 24 in the guide rails is secured to this srocket chain, and it will be apparent that by operation of the handle 27 the guide bars may be moved to their upper limits or withdrawn within the back of the rumble seat. At the upper limit, the guide bars project above the back of the rumble seat a sufficient distance to support a top covering and provide ample head room for the occupants.

The covering is in the form of a flexible curtain 29 which extends over the brace rods 22 between the guide bars, downwardly through the rumble seat back 19, over guide rollers 30, and then forwardly in an appropriate space in the automobile body below the rumble seat, the lower or bottom end of the curtain being connected to a fixture at the forward end of the space referred to by springs 31. The upper or free end of the curtain 29 is provided with appropriate fastening elements 32, and the upper portion of the rear wall of the covering for the forward or driver's seat is provided with complementary fastening means 33 to receive the fastening elements 32. The forward edge of the curtain is also formed so that it may be limited by the upper roller brace 22 when the curtain is moved to inoperative position, such as hooks 34 or the like. Side curtains 35 are secured to the edges of the curtain 29 for an appropriate length to cover the sides of the rumble seat space when desired, these side curtains being folded flat against the under side of the curtain 29 and fastened in place when not desired for use. The side curtains, of course, may be provided with appropriate openings covered by transparent material for visibility of the occupants of the rumble seat.

When not desired for use, the side curtains are folded against the main curtain 29 and the latter under the influence of the springs drawn to the limit permitted by the cross strut 22. The chain 28 is then operated by the handle to move the guide bars 21 carrying the curtain parts into the hollow portion of the rumble seat back 19. When desired for use, the handle 27 is operated to project the guide bars 21 to their upper limit, the forward edge of the curtain 29 is drawn forwardly, against the tension of springs 31, and secured by fastenings 32 and 33 to the rear wall of the covering for the front or driver's seat. The side curtains, if desired, are lowered into place and fastened to the sides of the rumble seat by any conventional curtain fastener. The springs 31 act to maintain the curtain 29 smooth and unrumpled in both inoperative or operative positions of such curtain, and hence conventional curtain material may be employed without liability of cracking the surface. The handles 27 are within convenient reach of the occupants of the rumble seat, permitting either the removal or operative positioning of the protecting means even while the automobile is moving.

In both forms, the invention provides an effective, weatherproof covering for the occupants of the rumble seat of an automobile, and a covering which may be readily and easily moved into operative relation with the rumble seat, or removed from such relation and effectively concealed. Thus the known disadvantages of the open rumble seat are simply and entirely avoided, and the occupants of such seat may have as full and adequate protection against the elements as the occupants of the remaining seats of the automobile.

I claim:—

1. In a rumble seat having a folding back serving when closed to cover the rumble seat, a seat protective covering including guide rails fixed in the folding back of the rumble seat, guide bars movable in said rails, and endless chain to which the guide bars are connected for moving said guide bars into and out of the rails, and a curtain movable in the space within the body of the automobile and over the guide bars, said curtain being removably connected with one of the guide bars to compel movement of the curtain in one direction in the movement of the guide bars, the curtain being independently movable with respect to the guide bars to permit the extension of the curtain beyond the guide bars for forming a protective top for the rumble seat.

2. In a rumble seat having a folding back, a protective covering including guide rails fixed in the folding back of the rumble seat, guide bars movable in said rails, an endless chain to which the guide bars are connected for moving said guide bars into and out of the rails, and a curtain movable without folding in the space within the body of the automobile and over the guide bars, said curtain being movable with the guide bars and separable from the guide bars and movable therebeyond to form a protective top for the rumble seat, and springs connected to the curtain and to the automobile to draw the curtain toward inoperative position when not desired for use.

3. In a rumble seat having a folding back, a protective covering including guide rails fixed in the folding back of the rumble seat, guide bars movable in said rails, an endless chain to which the guide bars are connected for moving said guide bars into and out of the rails, a main curtain movable in the space within the body of the automobile and over the guide bars, one end of the curtain being removably connected to the guide bars to initially move the curtain toward operative position in the movement of the guide bars, said curtain being movable beyond the guide bars to form a protective top for the rumble seat, and side curtains connected to and foldable with relation to the main curtain.

4. In a rumble seat having a folding back, a protective covering including guide rails fixed in the folding back of the rumble seat, guide bars movable in said rails, an endless chain to which the guide bars are connected for moving said guide bars into and out of the rails, a curtain movable in the space within the body of the automobile and over the guide bars, said curtain being initially movable with the guide bars, said curtain being movable independently of the guide bars to form a protective top for the rumble seat, and means accessible to an occupant of the rumble seat for operating said endless chain.

JOSEPH E. TAMÉS. [L. S.]